Figure 7:
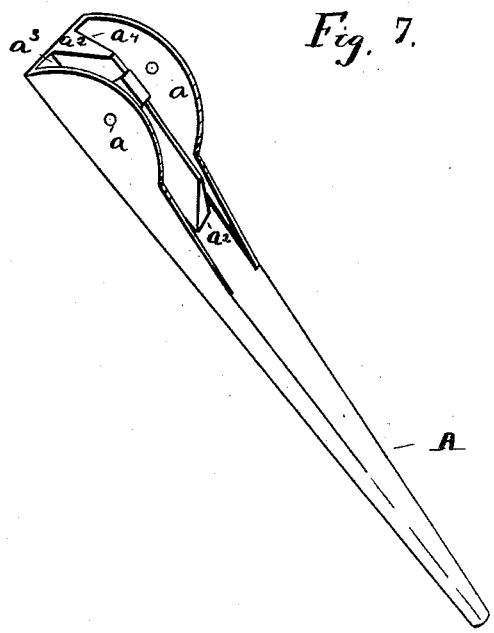

(No Model.) 2 Sheets—Sheet 1.
F. P. CRAIG.
CLAW BAR.
No. 432,299. Patented July 15, 1890.
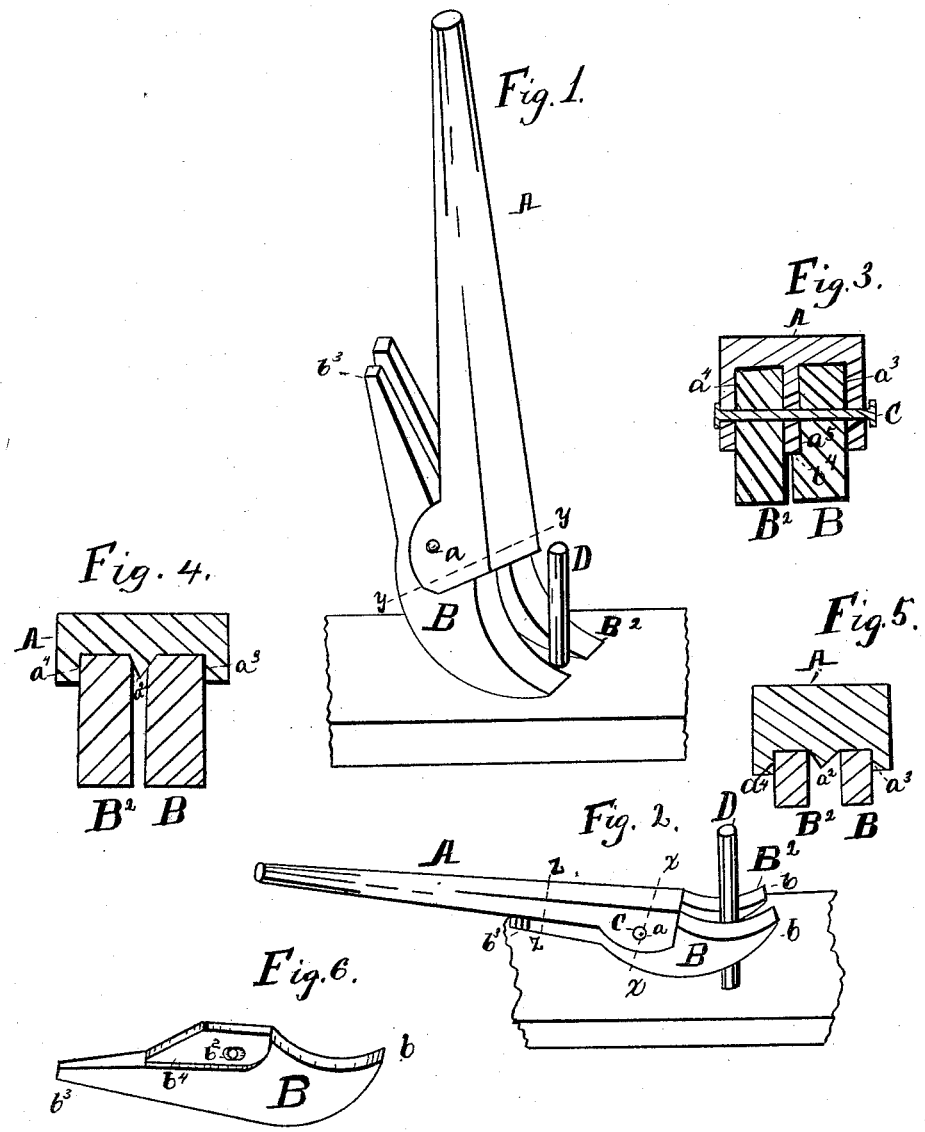
Witnesses.
N. A. Haseltine,
B. R. Brewer
Inventor.
Franklin P. Craig.
By S. A. Haseltine & Bro.
Attys.

(No Model.)  2 Sheets—Sheet 2.

F. P. CRAIG.
CLAW BAR.

No. 432,299.  Patented July 15, 1890.

Witnesses.
V. Haseltine.
N. A. Haseltine.

Inventor.
Franklin P. Craig
By S. A. & S. C. Haseltine,
Attorneys.

UNITED STATES PATENT OFFICE.

FRANKLIN P. CRAIG, OF SPRINGFIELD, MISSOURI.

CLAW-BAR.

SPECIFICATION forming part of Letters Patent No. 432,299, dated July 15, 1890.

Application filed May 5, 1887. Renewed January 25, 1890. Serial No. 338,042. (No model.)

*To all whom it may concern:*

Be it known that I, FRANKLIN P. CRAIG, a citizen of the United States, residing at Springfield, in the county of Greene and State of Missouri, have invented certain new and useful Improvements in Claw-Bars; and I do hereby declare the following to be a full, clear, and exact description of the invention, such as will enable others skilled in the art to which it appertains to make and use the same.

My invention relates to claw-bars having movable jaws, the object of which is to provide a cheap and simple device for quickly and easily drawing bolts, spikes, &c., by clasping them as they are drawn. These objects I attain by means of the device illustrated in the accompanying drawings, forming a part of this specification, in which—

Figure 1 is a view in elevation of the entire device as opened to receive a bolt to be drawn. Fig. 2 is a view in elevation of the same, showing the bolt partly drawn and tightly clasped by the jaws. Fig. 3 is a cross vertical section on the line $x\,x$ of Fig. 2. Fig. 4 is a cross-section on the line $y\,y$ of Fig. 1. Fig. 5 is a cross-section on the line $z\,z$ of Fig. 2. Fig. 6 is a detail showing one of the claws detached. Fig. 7 is a detail of the bar, showing the middle piece that opens and closes the jaws, wedge-shaped at its ends and rectangular at its middle.

Similar letters of reference indicate corresponding parts in the several figures.

A is a bar, of any desired size and shape, having two grooves at its lower end $a^3\,a^4$ for receiving the claws B B². Said grooves are placed on one side of the bar A, being deepest at the end of the bar, where they cut nearly through the bar, and get shallower toward the cross-hole $a$, where the pin C is placed, and running still shallower as they go up on the bar above the hole $a$ until they entirely disappear, the middle projection $a^2$ being made wedge-shaped, preferably in front of and behind the pin C, as shown in Figs. 4 and 5, but may be made wedge-shaped throughout its entire length; but the middle portion is preferably made thinner or of uniform width, as shown at $a^5$ in Fig. 3.

B B² are claws, of any desired size, shape, and length, to enter the grooves $a^3\,a^4$. They are provided with holes $b^2$ to receive a bolt or pin C, which passes through holes $a$ of the bar A. The holes $b^2$ are preferably made elongated or slotted on the inner sides next to the middle projection $a^2$ for giving the claws freedom of motion, so that the front ends $b$ will spread as the bar is raised, as shown in Fig. 1, to receive the bolt D or other thing to be drawn, the claws being pivoted on the bolt or pin C. The back ends $b^3$ of the claws drop down, which permits the front ends to be spread by the wedge-shaped projection $a^2$.

In order that the claws may fit closely together, when desired, the claws are formed with portions removed to receive the projection $a^2$, as shown at $b^4$ in Figs. 3 and 6. When the bar is drawn down in the act of pulling the spike, bolt, or other thing to be drawn, as shown in Figs. 2 and 5, the back ends $b^3$ are spread, which causes the claws to clasp the bolt D, projection $a^2$ being wedge-shaped at its back end as well as its front end, while its middle is preferably rectangular, as shown.

Bolt or pin C may be secured in place by any suitable means.

Having thus described my invention, what I claim as new, and desire to secure by Letters Patent, is—

1. The claw-bar herein described, consisting of the bar A, having two parallel longitudinal grooves in its end, a central projection between the grooves, which is wedge-shaped at its ends, and the jaws B B², pivoted to the bar in the grooves, their sides being constructed to work against the said central projection, substantially as described.

2. A bar A, having two grooves $a^3\,a^4$ in one end, the middle projection of which is wedge-shaped near the ends and rectangular at its middle, and the jaws B and B², pivoted to the bar in the grooves, as shown and described.

3. Claws B B², having portions at $b^4$ removed, and slotted holes $b^2$, combined with a bar having grooves $a^3\,a^4$, and a middle projection $a^2$, wedge-shaped near its ends, and a bolt C, all substantially as and for the purpose set forth.

In testimony whereof I affix my signature in presence of two witnesses.

FRANKLIN P. $\overset{\text{his}}{\times}$ CRAIG.
<div style="text-align:center">mark</div>

Witnesses:
W. E. DUNN,
M. L. HASELTINE.